(No Model.)

T. W. HAUS.
BRAKE FOR CHILDREN'S CARRIAGES.

No. 352,689. Patented Nov. 16, 1886.

WITNESSES:
Dorr Twitchell
G. Sedgwick

INVENTOR:
T. W. Haus
BY Munn & Co.
ATTORNEYS.

United States Patent Office.

T. WILSON HAUS, OF MEADVILLE, PENNSYLVANIA.

BRAKE FOR CHILDREN'S CARRIAGES.

SPECIFICATION forming part of Letters Patent No. 352,689, dated November 16, 1886.

Application filed May 10, 1886. Serial No. 201,709. (No model.)

*To all whom it may concern:*

Be it known that I, T. WILSON HAUS, of Meadville, in the county of Crawford and State of Pennsylvania, have invented a new and Improved Brake for Children's Carriages, of which the following is a full, clear, and exact description.

My invention relates to brakes for children's carriages, and has for its object to provide a simple, inexpensive, and effective device of this character which may be operated by the foot of the attendant to lock and unlock the carriage-wheel.

The invention consists in certain novel features of construction and combinations of parts of the carriage-brake, all as hereinafter fully described and claimed.

Reference is to be had to the accompanying drawings, forming a part of this specification, in which similar letters of reference indicate corresponding parts in all the figures.

Figure 1:
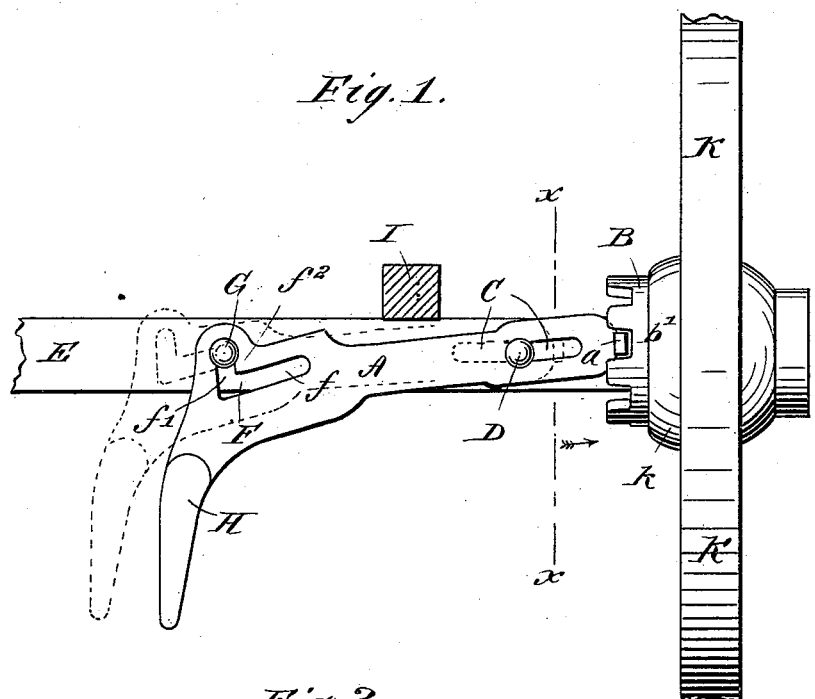
Figure 2:
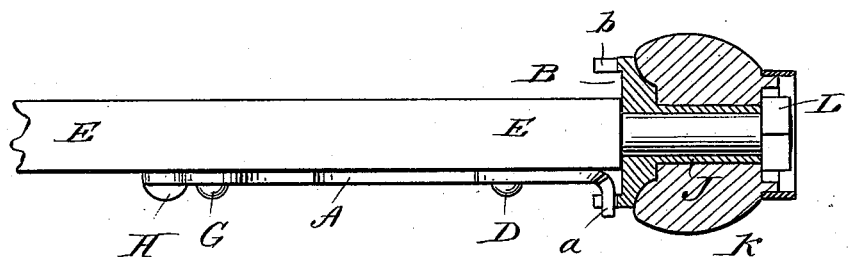
Figure 3:
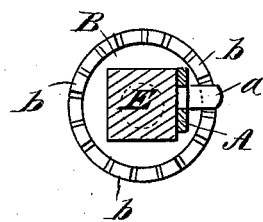

Figure 1 is a rear view of portions of the hind axle and one wheel of a child's carriage to which my improved brake is applied. Fig. 2 is a plan view thereof with the wheel-hub in section; and Fig. 3 is a cross-section taken on the line $x$ $x$, Fig. 1, and a face view of the notched clutch-plate on the hub of the carriage-wheel.

The brake consists of a bar or plate, A, attached to the axle of the carriage, and a notched clutch-plate, B, attached to the hub of a wheel of the carriage, and with which the brake-bar A may be engaged, as presently explained.

The bar A is provided near its outer end with a slot, C, through which a headed bolt, D, is passed into the axle E of the carriage, and near its outer or back end the brake bar is provided with an angular slot, F, having a long portion, $f$, inclined to the longitudinal center line of the bar, and a short portion, $f'$, opening from the portion $f$ and ranging about at a right angle therewith. Through this slot F a headed bolt, G, is passed into the carriage-axle E. The bolts D G thus hold the brake-bar A securely to the carriage-axle and allow the bar to be moved endwise by the application of the foot of a person wheeling the carriage to the pendent arm H, formed on or fixed to the back or outer end of the brake-bar.

The letter I indicates one of the side bars of the push-frame of the carriage, and is fixed to the axle E in the usual way.

The brake-bar A is adapted to engage the clutched plate B by means of a lip or lug, $a$, projecting from the outer end of the bar, and which may be set into any one of a series of notches, $b$, made in an annular flange projecting from the face of the plate B, which plate is preferably formed on the axle-box J, which is fixed in the hub $k$ of the carriage-wheel K, which turns with its box on the axle E, and is held to the axle by a nut, L, or it may be by a linchpin passed through the end of the axle-arm. The plate B may be made separate from the axle-box and may be fixed in any approved way to the hub of the wheel.

When the brake is to be applied to the wheel K to prevent it from turning on the axle, for stopping the carriage or holding it at rest, the arm H of the brake-bar A will be pushed by the foot of the attendant from the position shown in dotted lines in Fig. 1 outward toward the wheel K, and the lug $a$ of the brake-bar will enter one of the notches $b$ of the clutch-plate B, as the vertical portion $f'$ of the slot F of bar A moves opposite the bolt G, and the brake-bar then drops until the end wall or base of the part $f'$ of slot F rests on the bolt, and the shoulder or side wall, $f^2$, of the slot F then stands in front or outside of the bolt and locks the lug $a$ of bar A into the notch $b$ of the plate B.

To release the brake, it only is necessary for the attendant to lift the brake-bar by action of the foot on the arm H until the part $f'$ and shoulder $f^2$ of slot F clear the bolt G, which then enters the inclined part $f$ of slot F as the brake-bar is slid backward by the foot, as in dotted lines, to disengage the lug $a$ of the bar from the notch of the clutch-plate, and the wheel K is again free to turn on the axle.

The bolt or stud D not only holds the forward end of the brake-bar A to the axle, but serves as a fulcrum on which the bar moves when the part $f$ of the slot F is caused to engage the bolt or stud G or is disengaged from the bolt, as above described.

The downward incline of the part $f$ of the slot F from its outer end toward the part $f'$ of said slot, together with the gravity of the brake-bar and consequent friction on the bolt or stud G, prevents the brake-bar from being moved outward by the ordinary motions or jolting of the carriage into engagement with the clutch-plate B; hence the brake may be applied only at the will of the person wheeling the carriage.

This brake may be applied to any ordinary wheeled vehicle.

Having thus fully described my invention, I claim as new and desire to secure by Letters Patent—

1. The combination, in a brake for children's carriages, of a brake-bar, A, held to slide on the carriage-axle and provided with an angular slot, F, forming a locking-shoulder, $f^2$, a bolt, G, entering slot F, and a clutch-plate, B, fixed to the carriage-wheel and having notches $b$, to which the bar A is adapted, substantially as herein set forth.

2. The combination, in a brake for children's carriages, of a brake-bar, A, having a slot, C, and an angular slot, F, bolts, as at D, G, entering said slots and holding the bar A to the carriage-axle, and a clutch-plate, B, fixed to the carriage-wheel and having notches $b$, to which the bar A is adapted, substantially as herein set forth.

3. In a brake for children's carriages, the brake-bar A, made with a slot, C, an angular slot, F, and a pendent arm, H, in combination with bolts D G, and a clutch-plate, B, fixed to the carriage-wheel and having notches $b$, to which the bar A is adapted, substantially as herein set forth.

T. WILSON HAUS.

Witnesses:
M. GURTNER,
A. J. DEITSCH.